United States Patent
Kumar et al.

(10) Patent No.: US 10,154,453 B2
(45) Date of Patent: Dec. 11, 2018

(54) MOBILE DEVICE POSITION DETERMINATION USING NON-DEDICATED-FREQUENCY NODES

(71) Applicant: QUALCOMM Incorporated, San Diego, CA (US)

(72) Inventors: Akash Kumar, Hyderabad (IN); Amit Jain, San Diego, CA (US); Sai Pradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/493,418

(22) Filed: Apr. 21, 2017

(65) Prior Publication Data
US 2018/0310237 A1    Oct. 25, 2018

(51) Int. Cl.
*H04W 4/00* (2018.01)
*H04W 48/18* (2009.01)
(Continued)

(52) U.S. Cl.
CPC ............. *H04W 48/18* (2013.01); *H04W 4/02* (2013.01); *H04W 4/023* (2013.01); *H04W 8/005* (2013.01);
(Continued)

(58) Field of Classification Search
CPC . H04W 48/18; H04W 72/0453; H04W 8/005; H04W 4/023; H04W 8/183; H04W 4/02; H04W 16/14; H04W 84/042
(Continued)

(56) References Cited

U.S. PATENT DOCUMENTS

| 8,447,327 B2 * | 5/2013 | Escolar-Piedras | .... G01S 5/0221 |
| | | | 370/330 |
| 8,751,613 B1 * | 6/2014 | Medved | .................. H04L 45/00 |
| | | | 370/229 |

(Continued)

FOREIGN PATENT DOCUMENTS

| WO | 2016053173 A1 | 4/2016 |
| WO | 2016122982 A1 | 8/2016 |

(Continued)

OTHER PUBLICATIONS

Partial International Search Report—PCT/US2018/021572—ISA/EPO—dated May 16, 2018.
International Search Report and Written Opinion—PCT/US2018/021572—ISA/EPO—dated Jul. 9, 2018.

*Primary Examiner* — Amancio Gonzalez
(74) *Attorney, Agent, or Firm* — Thien T. Nguyen

(57) ABSTRACT

A method includes: receiving, at a mobile device configured for communication using a communication protocol associated with a dedicated frequency band, a first inbound signal from a first node, the first inbound signal having a format in accordance with the communication protocol and having a first frequency that is outside the dedicated frequency band; receiving a second inbound signal, from a second node, having a same format in accordance with the communication protocol as the first inbound signal and having a second frequency in the dedicated frequency band; determining location information for the first node using the first inbound signal; and sending an outbound signal to a location server, the outbound signal including the location information for the first node and a node identifier of the second node, the outbound signal being formatted according to the communication protocol and having a frequency in the dedicated frequency band.

26 Claims, 8 Drawing Sheets

(51) Int. Cl.
*H04W 4/02* (2018.01)
*H04W 8/18* (2009.01)
*H04W 16/14* (2009.01)
*H04W 8/00* (2009.01)
*H04W 72/04* (2009.01)
*H04W 84/04* (2009.01)

(52) U.S. Cl.
CPC ........... *H04W 8/183* (2013.01); *H04W 16/14* (2013.01); *H04W 72/0453* (2013.01); *H04W 84/042* (2013.01)

(58) Field of Classification Search
USPC ........................................................ 455/434
See application file for complete search history.

(56) References Cited

U.S. PATENT DOCUMENTS

2014/0329557 A1* 11/2014 Van der Velde ........ H04W 8/24
455/552.1
2016/0223641 A1* 8/2016 Cheng ................... G01S 5/0036

FOREIGN PATENT DOCUMENTS

| WO | 2016144028 A1 | 9/2016 |
| WO | 2016151459 A2 | 9/2016 |
| WO | 2017027126 A1 | 2/2017 |

\* cited by examiner

MOBILE DEVICE POSITION DETERMINATION USING NON-DEDICATED-FREQUENCY NODES

BACKGROUND

Mobile communication devices are nearly ubiquitous today. As the devices are mobile, in addition to providing communication capabilities, a mobile device may also provide information regarding a location of the mobile device, e.g., to assist various applications to provide a variety of services to a user of the mobile device. The mobile device, such as a user equipment (UE), may be configured to perform positioning techniques to determine the location of the UE and/or to provide information to another device, e.g., a location server, that determines the location of the UE. For example, the UE or location server may use multilateration techniques to determine the location of the UE. To perform or assist with multilateration, the UE receives and analyzes positioning signals from multiple signal emitters, e.g., base stations, located at known locations. One example of a positioning technique that uses multilateration is Observed Time Difference Of Arrival (OTDOA), that uses differences in arrival times of positioning signals (e.g., positioning reference signal (PRS)) received by the UE from the multiple base stations to determine the location of the UE. A PRS may be referred to herein as a PRS signal and multiple PRSs may be referred to herein as PRS signals.

In order to perform OTDOA, or other positioning techniques, the location of the emitters and other information about the PRS signals are used. This information is provided to the UE in the form of assistance data. Assistance data may be sent from a serving base station to the UE from a location server associated with the network, or the assistance data may be received from a third party server. The assistance data may help the UE acquire the positioning signals, e.g., by providing search windows of time when the PRS signals should arrive at the UE.

SUMMARY

An example method includes: receiving, at a mobile device configured for communication using a communication protocol associated with a dedicated frequency band, a first inbound signal from a first node, the first inbound signal having a format in accordance with the communication protocol and having a first frequency that is outside the dedicated frequency band; receiving, at the mobile device, a second inbound signal from a second node, the second inbound signal having a same format in accordance with the communication protocol as the first inbound signal and having a second frequency in the dedicated frequency band; determining, at the mobile device, location information for the first node using the first inbound signal; and sending an outbound signal to a location server from the mobile device, the outbound signal including the location information for the first node and a node identifier of the second node, the outbound signal being formatted according to the communication protocol and having a frequency in the dedicated frequency band.

An example of a mobile wireless communication device includes: an antenna configured to send and receive first signals in a first frequency band and to receive second signals in a second frequency band, the second frequency band being dedicated to a communication protocol and the first frequency band being separate from the second frequency band; and a processor, communicatively coupled to the antenna, configured to: receive, from the antenna, a first inbound signal from a first node, the first inbound signal having a first frequency in the first frequency band and having a format in accordance with the communication protocol; receive, from the antenna, a second inbound signal from a second node, the second inbound signal having a second frequency in the second frequency band and having a same format in accordance with the communication protocol as the first inbound signal; determine location information for the first node using the first inbound signal; and send, via the antenna, an outbound signal to a location server, the outbound signal including the location information for the first node and a node ID that identifies the second node, the outbound signal being formatted according to the communication protocol and having a frequency in the second frequency band.

Another example of a mobile wireless communication device includes: means for receiving a first inbound signal from a first node, the first inbound signal having a format in accordance with a communication protocol associated with a dedicated frequency band and having a first frequency that is outside the dedicated frequency band; means for receiving a second inbound signal from a second node, the second inbound signal having a same format in accordance with the communication protocol as the first inbound signal and having a second frequency in the dedicated frequency band; first determining means for determining location information for the first node using the first inbound signal; and means for sending an outbound signal to a location server, the outbound signal including the location information for the first node and a node identifier of the second node, the outbound signal being formatted according to the communication protocol and having a frequency in the dedicated frequency band.

An example of a non-transitory, processor-readable storage medium includes processor-readable instructions configured to cause a processor to: receive a first inbound signal from a first node, the first inbound signal having a format in accordance with a communication protocol associated with a second frequency band that is dedicated to the communication protocol, the first inbound signal having a first frequency that is in a first frequency band that is separate from the second frequency band; receive a second inbound signal from a second node, the second inbound signal having a same format in accordance with a communication protocol as the first inbound signal and having a second frequency in the second frequency band; determine location information for the first node using the first inbound signal; and send an outbound signal to a location server, the outbound signal including the location information for the first node and a node ID that identifies the second node, the outbound signal being formatted according to the communication protocol and having a frequency in the second frequency band.

DETAILED DESCRIPTION

Techniques are discussed herein for determining a position of a mobile wireless communication device. For example, a mobile device configured to communicate using a particular protocol may report information regarding one or more base stations that operate according to the particular protocol and communicate in a frequency band dedicated to the particular protocol. The mobile device may defy convention and report information regarding one or more base stations that operate according to the particular protocol but communicate in an unlicensed (i.e., not dedicated to the particular protocol) frequency band. For example, a user equipment (UE) configured to communicate using the Long-Term Evolution (LTE) protocol may report, to a location server, information regarding nodes from which the UE has received signals. The UE may report information regarding one or more LTE nodes that operate according to the LTE protocol and communicate in the licensed LTE frequency band and one or more LTE-U (LTE-Unlicensed, also called LTE-LAA (LTE-License Assisted Access)) nodes that operate according to the LTE protocol and communicate in an unlicensed frequency band. The UE may report node identities of the LTE-U nodes and the LTE nodes and the location server may use the node identities along with known locations of the nodes to estimate a location of the UE. Based on the estimated location of the UE, the location server may send assistance data that the UE may use to acquire PRS signals from the nodes. The assistance data may include a search window for each of the PRS signals, and these search windows may be smaller than what they would be had the UE not reported information regarding the LTE-U nodes.

Items and/or techniques described herein may provide one or more of the following capabilities. Estimated locations and location uncertainties of mobile devices based on neighboring nodes may be improved, e.g., by providing and using information regarding nodes operating in one or more non-dedicated frequency bands. Positioning measurements may be made by a mobile device using smaller search windows and less power than historically used. Accuracy of determined position of a mobile device may be improved. Further, it may be possible for an effect noted above to be achieved by means other than that noted, and a noted item/technique may not necessarily yield the noted effect.

Figure 1:
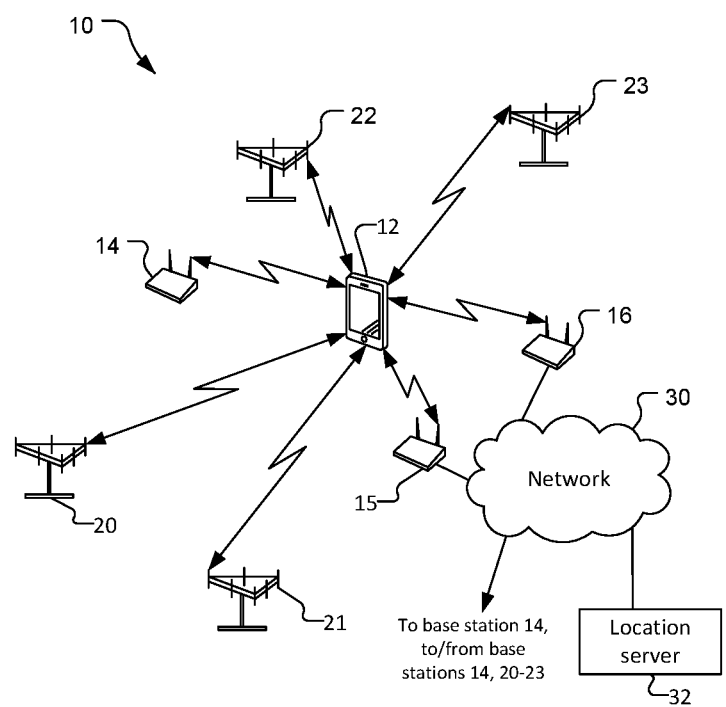
FIG. 1 is a simplified diagram of a wireless communications system.

Referring to FIG. 1, a wireless communication system 10 includes a mobile device 12, short-range base stations 14, 15, and 16 (base stations 14-16), cellular base stations 20-23, a network 30, and a location server 32. The system 10 is a communication system in that components of the system 10 can communicate with one another directly or indirectly, e.g., via the network 30 and/or one or more of the base stations 14-16, 20-23. The mobile device 12 is shown as a smartphone, but other types of mobile devices may be used such as a laptop computer or a tablet computer. Still other mobile devices may be used, whether currently existing or developed in the future. The mobile device 12 is configured to communicate wirelessly with the base stations 14-16, 20-23. The base stations 14-16 are short-range base stations while the base stations 20-23 are cellular base stations in that the base stations 14-16 use lower transmit power than the base stations 20-23 for their respective wireless signal transmissions. Each of the base stations 14-16, 20-23 is communicatively coupled to the network 30 using, for example, a physical connection such as an electrical wire or an optical cable. The quantities of the base stations 14-16, 20-23 are examples used for illustration, and other quantities of short-range base stations and/or cellular base stations may be used.

The mobile device 12 is configured, and the base stations 14-16, 20-23 are configured, to have radio frequency (RF) signals sent by the base stations 14-16, 20-23 and received by the mobile device 12, and to have RF signals sent from the mobile device 12 and received by the base stations 20-23. The mobile device 12 may be called a mobile station (MS), a user equipment (UE), a terminal, a station, a device, a wireless device, a subscriber unit, a target, or other term. Each of the base stations 14-16, 20-23 may be a wireless base transceiver station (BTS), a Node B, an evolved NodeB (eNB), a femtocell, a Home Base Station, a small cell base station, a Home Node B (HNB), a Home eNodeB (HeNB), etc. The base stations 14-16, 20-23 may be referred to herein as nodes. The network 30 may be a 2G, a 3G, a 4G, or a 5G network, a hybrid network (e.g., a 3G/4G network), a network using a technology developed in the future, or a combination of two or more of these. The mobile device 12 is configured to communicate with the network 30 using one or more radio access technologies (RATs), such as GSM (Global System for Mobile Communications), code division multiple access (CDMA), wideband CDMA (WCDMA), Time Division CDMA (TD-CDMA), Time Division Synchronous CDMA (TDS-CDMA), CDMA2000, High Rate Packet Data (HRPD), LTE. These are examples of network technologies that may be used to communicate with the mobile device 12 over a wireless link.

The base stations 20-23 are configured to send and receive RF signals having frequencies in a dedicated frequency band, i.e., a frequency band that is dedicated for use by devices communicating in accordance with a particular communication protocol while the base stations 14-16 are configured to send RF signals having frequencies outside of the dedicated frequency band. For example, the base stations 20-23 may be LTE nodes, such as Node Bs, that are configured to communicate using signals having frequencies in a licensed LTE frequency band (e.g., 400 MHz-3.8 GHz) while the base stations 14-16 may be LTE-Unlicensed (LTE-U) nodes that are configured to communicate using signals having frequencies outside the licensed LTE frequency band, e.g., in an unlicensed band (e.g., above 5 GHz). LTE-U is a radio access technology for providing carrier-grade wireless service in the 5 GHz unlicensed frequency band. The discussion herein uses LTE as the communication protocol as an example and to aid in understanding, but neither the discussion nor the claims, unless explicitly stated otherwise, are limited to LTE.

One of the base stations 20-23 is designated as the primary base station for communication with the mobile device 12. The primary base station 20-23 (sometimes referred to as the serving base station or the serving cell) is the base station 20-23 with which the mobile device 12 manages the communication with the network 30. The primary base station 20-23 may change, e.g., as the mobile device moves.

As LTE-U SDL (Supplemental Downlink) is a downlink only transmission scheme from the base stations 14-16 to the mobile device 12, the base stations 14-16 have historically not been provided in a neighbor list to a server as the base stations 14-16 cannot be reselected and handed over to for bi-directional communication with the mobile device 12. The base stations 14-16, however, operate using the same LTE protocol as the base stations 20-23, and are similar to the base stations 20-23 from a deployment and management perspective in that the location server 32 knows the locations of the base stations 14-16 (e.g., stores a database of the identities and locations of the base stations 14-16). Further, the base stations 14-16 typically have much smaller cell sizes compared to base stations 20-23 because the base stations 14-16 must fairly coexist with Wi-Fi and other LTE-U nodes and thus transmit using far less power than the base stations 20-23 do. For example, an LTE-U base station may have a maximum transmit power of about 1 W while an LTE base station typically has a transmit power of 20-69 W. Consequently, the cell sizes for the base stations 14-16 are typically on the order of meters or tens of meters while the cell sizes for the base stations 20-23 are typically on the order of hundreds of meters or kilometers.

Figure 2:
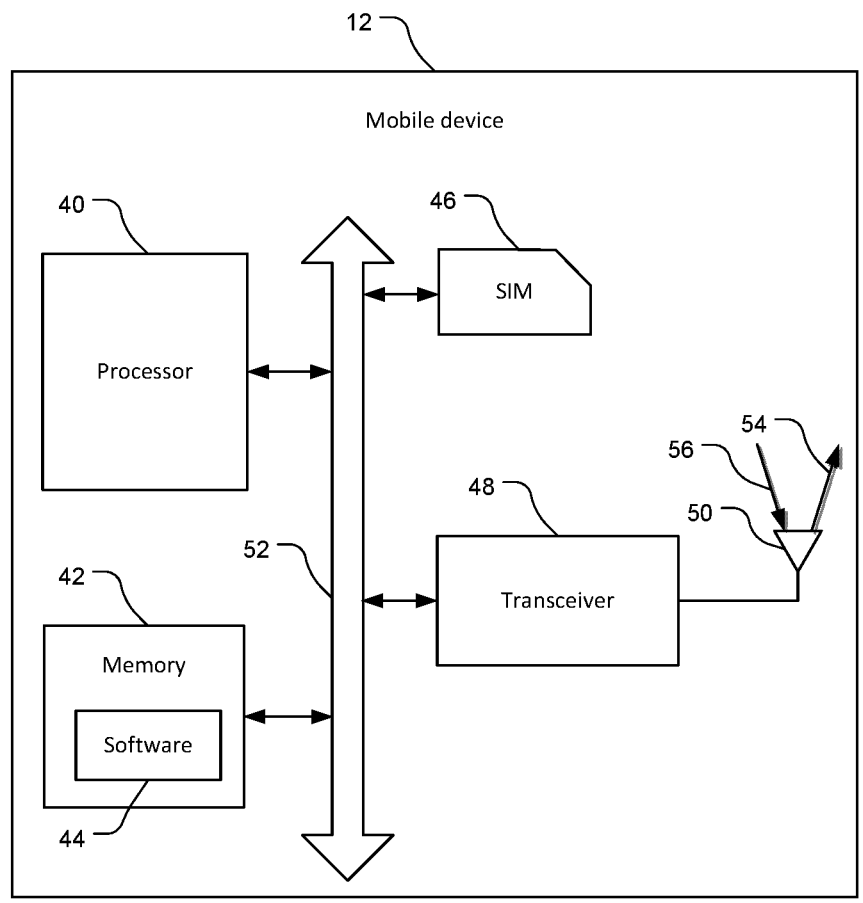
FIG. 2 is a block diagram of an example of a mobile device shown in FIG. 1.
Figure 5:
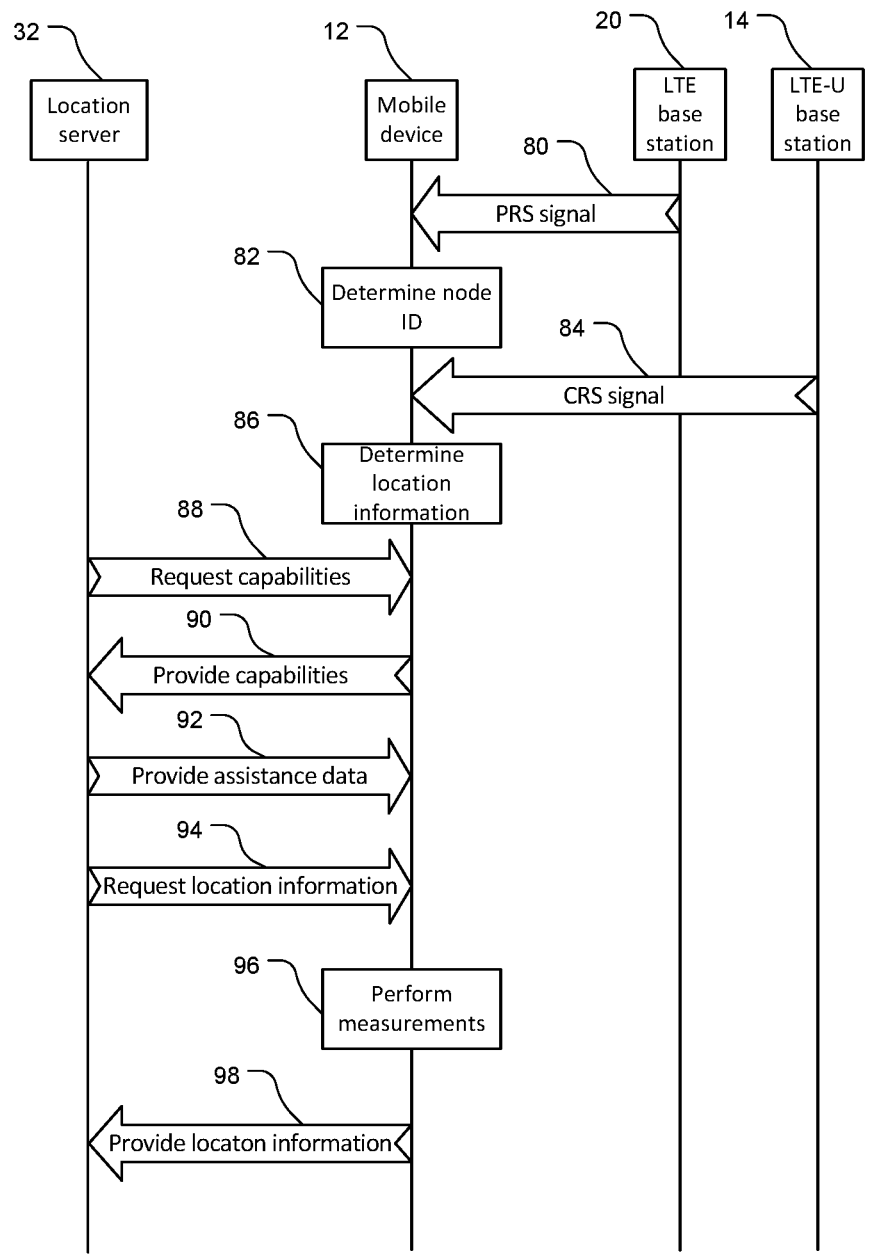
FIG. 5 is a flow diagram of determining information for determining position of the mobile device shown in FIG. 1.

Referring to FIG. 2, with further reference to FIG. 1, an example of the mobile device 12 includes a processor 40, a memory 42 including software 44, a subscriber identity module (SIM) card SIM 46, a transceiver 48, an antenna 50, and a bus 52. The processor 40 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 40 may comprise multiple separate physical entities that can be distributed in the mobile device 12. The memory 42 may include random access memory (RAM) and/or read-only memory (ROM). The processor 40 is communicatively coupled to the memory 42. The memory 42 is a non-transitory, processor-readable storage medium that stores the software 44 which is processor-readable, processor-executable software code containing instructions that are configured to, when performed, cause or instruct the processor 40 to perform various functions discussed herein, for example, the processes illustrated in FIG. 8 and/or perform the processes on behalf of mobile device 12 as shown in call flow illustrated in FIG. 5. As appropriate, the code causing or instructing the processor 40 to perform various functions (as illustrated in FIGS. 5 and/or 8) may also include code causing or instructing other components described herein, for example the transceiver 48, to perform various functions as appropriate. The description may refer only to the processor 40 performing the functions, but this includes other implementations such as where the processor 40 executes software and/or firmware. The software 44 may not be directly executable by the processor 40 and instead may be configured to, for example when compiled and executed, cause the processor 40 to perform the functions discussed. Whether needing compiling or not, the software 44 contains the instructions to cause the processor 40 to perform the functions. The processor 40 in combination with the memory 42 provide means for performing functions as described herein, for example, receiving and analyzing signals from base stations, and producing and sending communications to a location server with information about the base stations. The software 44 may be loaded onto the memory 42 by being downloaded via a network connection, uploaded from a disk, etc. The processor 40, the memory 42, the SIM 46, and the transceiver 48 (and by extension the antenna 50) are communicatively coupled to one another via the bus 52, with the bus 52 being configured to convey information between the components.

The SIM 46 is configured to provide access to a communication network subscription, or simply "a subscription," associated with network 30. The SIM 46 may be, for example, part of a Universal Integrated Circuit Card (UICC) and may include a processor, ROM, RAM, Electrically Erasable Programmable Read-Only Memory (EEPROM) and/or circuitry. The SIM 46 is configured to store user account information, an international mobile subscriber identity (IMSI), SIM application toolkit (SAT) command instructions, and storage space for additional information, such as telephone book contact information. The SIM 46 may be omitted depending upon the interaction with the network 30 appropriate for any given implementation.

The transceiver 48 and the antenna 50 are communicatively coupled to each other and configured to transmit and receive signals wirelessly. The antenna 50 is configured to receive transmission signals from the transceiver 48, and to transduce and send wireless signals 54 corresponding to the transmission signals received from the transceiver 48. Further, the antenna is configured to receive wireless signals 56, sent by one or more base stations, to transduce the wireless signals 56 into received signals, and to send the received signals to the transceiver 48. While the antenna 50 is shown as one physical device, the antenna 50 may comprise multiple physical devices, e.g., with different devices for sending/receiving signals of different frequencies (e.g., in different frequency bands). For example, separate physical devices could be used for sending/receiving signals in a licensed frequency band and receiving signals in an unlicensed frequency band.

The mobile device 12 is configured to receive signals from the base stations 14-16 and determine location information for the base stations 14-16 from which the mobile device 12 receives a signal. For example, the antenna 50 and the transceiver 48 are configured to receive the signals 56, having frequencies in an LTE-U frequency band, and transduce and provide the received signals to the processor 40 via the bus 52. For example, the signals 56 may be cell-specific reference signals (CRS signals) from LTE-U base stations. The processor 40 is configured to analyze the received signals to determine location information for the base stations 14-16. The location information is information that may be used, e.g., by the location server 32, to determine a location (position) of the mobile device 12. For example, the location information may be a node ID (node identity, node identification) associated with a particular one of the base stations 14-16, with the location server 32 (or other device) knowing a relationship (e.g., storing a table) of node ID to location of the base station 14-16. As another example, the location information may be the actual location of the base station 14-16. The actual location may be indicated by the received signal, or the received signal may be used by the mobile device to determine a location of the base station (e.g., by sending a range to the base station 14-16 to the location server 32 for crowd-sourcing the location of the base station and receiving an indication of the location of the base station 14-16 from the location server 32). In one example, the location information comprises one, or both, of the node ID that identifies the first node (for example, one or more of base stations 14-16) and the actual location of the first node. Alternatively or additionally, the location information can comprise any information for which a location of the first node can be determined.

The mobile device 12 is configured to receive signals from the base stations 20-23 of FIG. 1 and determine information regarding each of the base stations 20-23 from which the mobile device 12 receives a signal. For example, the processor 40 can analyze inbound signals, having frequencies in an LTE licensed frequency band, received from the base stations 20-23 via the antenna 50, the transceiver 48, and the bus 52 to determine a node ID for each of the base stations 20-23 from which a signal is received. The processor 40 can distinguish LTE cells from LTE-U cells based on the frequencies of the signals received, as the processor 40 can identify signals in the LTE protocol that have frequencies above 5 GHz (presently 5.15-5.35 GHz and 5.47-5.85 GHz in the United States, 5.15-5.35 GHz and 5.47-5.725 GHz in Europe and Japan, and 5.15-5.35 GHz and 5.725-5.85 GHz in China) as LTE-U signals, and identify signals in the LTE protocol that have frequencies at or below 3.8 GHz as LTE signals.

The processor 40 is further configured to send a message to the location server 32 with the location information for one or more of the base stations 14-16 and information regarding one or more of the base stations 20-23. The processor 40 is configured to produce an outbound message including the location information, such as the node ID, for each of the base stations 14-16 from which a signal was received and information, such as a node ID, of each of the base stations 20-23 from which a signal was received. The processor 40 may produce the outbound message to include information for less than all of the base stations 14-16, 20-23 from which a signal is received. For example, the processor 40 may produce the outbound message to include, from among the base stations 20-23, only the base station 20-23 from which a signal was most recently received, or that is presently acting as the serving or primary base station (primary cell) for the mobile device 12. The outbound message may include information for each of the base stations 14-16 from which the mobile device is presently receiving a signal, and possibly for each of the base stations 14-16 from which the mobile device recently (e.g., within a threshold amount of time) received a signal. The processor 40 is configured to send the outbound message as part of a "provide capability message" sent to the location server 32. The processor 40 may be configured to produce the outbound signal such that the location information for all of the base stations 14-16 (all LTE-U base stations) indicated by the outbound signal is prioritized ahead of any of the base stations 20-23 (e.g., any LTE base station) that is indicated by the outbound signal. Thus, for example, if the mobile device 12 cannot report all the base stations 14-16, 20-23 from which the mobile device 12 has recently received a signal, the LTE-U base stations 14-16 are prioritized for reporting as the base stations 14-16 will likely be more useful in determining a coarse location of the mobile device 12. For example, if the processor 40 determines that a quantity of the LTE-U nodes for which the processor has information available to include in the outbound signal plus a quantity of LTE nodes for which the processor has information available to include in the outbound signal exceeds a limit of nodes that can be reported in the outbound signal, then the processor 40 may list all of the LTE-U nodes before any of the LTE nodes in the outbound signal. The limit may, for example, be a limit that the outbound signal is allowed to contain. The processor 40 can send the outbound message to the location server 32 via an outbound signal transmitted by the antenna 50 using the protocol of the base stations 20-23. Thus, for example, the processor 40 sends the outbound message as an LTE message to the primary (serving) cell among the base stations 20-23. Traditionally, a mobile device would only inform the location server of the serving cell of the mobile device and perhaps one or more neighbor LTE base stations.

The processor 40 is further configured to receive assistance data and use the assistance data to acquire signals for use in determining location of the mobile device 12. The processor 40 is configured to receive, via the antenna 50, assistance data from the location server 32, with the assistance data including information to help the mobile device 12 obtain information for use in determining the position of the mobile device 12. For example, the assistance data may include information to help the mobile device obtain measurement for use in OTDOA positioning. For example, the assistance data may include a search window for each of the base stations 20-23. Each search window is a period of time during which the location server 32 expects a PRS signal emitted by one of the base stations 20-23 to reach the mobile device 12. Each search window is thus a period of time during which the mobile device 12 should listen for, to try to acquire, the respective PRS signal. The processor 40 is configured to use the assistance data by searching for the respective PRS signals only during the respective search windows indicated by the assistance data. That is, the processor 40 is configured to wait for the respective search window for the respective base station 20-23 to search for the respective PRS signal. The search windows are typically provided as a search window center time relative to a receive time of a reference signal, plus a window size. In one implementation, the window center is an expected Reference Signal Time Difference (RSTD) and the window size is an RSTD uncertainty. The reference signal may be the PRS signal of the primary cell of the mobile device 12. Further, more than one search window may be provided for a single one of the base stations 20-23 as the base stations 20-23 repeatedly send their PRS signals. The assistance data may thus include information for multiple search windows and may provide this information in various formats, e.g., a periodicity or repetition interval such as a duration between consecutive search window centers (or other reference point of each of the search windows). The processor 40 is configured to search for a respective PRS signal during a first search window, discontinue searching for that PRS signal at the end of the first search window, wait until a second search window indicated by the assistance data for that PRS signal, and then search again for the PRS signal during the second search window. This process may be repeated until the PRS signal is acquired or a limit of search windows is reached. The limit of search windows may, for example, be indicated by the assistance data or may be a default number stored in the memory 42, or may be obtained by or provided to the processor 40 is some other way.

The processor 40 is configured to search for the PRS signals in an order in accordance with the assistance data. For example, the processor 40 may search for the PRS signals in accordance with the order of the information regarding the PRS signals in the assistance data. As another example, the assistance data may include indications of an order for the processor 40 to search for the PRS signals. That is, the assistance data may include a ranked list of information for the PRS signals for the base stations 20-23 and the processor 40 is configured to search for the PRS signals in an order according to the ranked list, examples of which are discussed further below.

Figure 3:
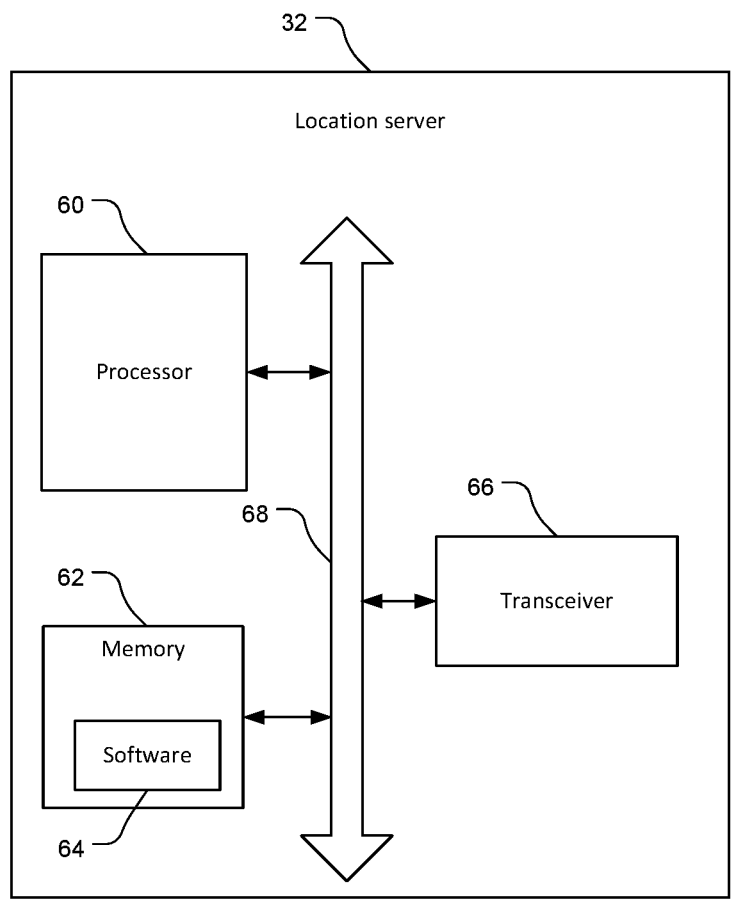
FIG. 3 is a block diagram of an example of a location server shown in FIG. 1.

Referring to FIG. 3, with further reference to FIGS. 1-2, an example of the location server 32 includes a processor 60, a memory 62 including software 64, a transceiver 66, and a bus 68. The processor 60 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 60 may comprise multiple separate physical entities that can be distributed in the location server 32. The memory 62 may include RAM and/or ROM. The processor 60 is communicatively coupled to the memory 62. The memory 62 is a non-transitory, processor-readable storage medium that stores the software 64 which is processor-readable, processor-executable software code containing instructions that are configured to, when performed, cause the processor 60 to perform various functions discussed herein. The description may refer only to the processor 60 performing the functions, but this includes other implementations such as where the processor 60 executes software and/or firmware. The software 64 may not be directly executable by the processor 60 and instead may be configured to, for example when compiled and executed, cause the processor 60 to perform the functions discussed. Whether needing compiling or not, the software 64 contains the instructions to cause the processor 60 to perform the functions. The processor 60 in combination with the memory 62 provide means for performing functions as described herein, for example, receiving and analyzing signals from the mobile device 12, producing and sending communications to the mobile device 12 with information about the base station signals, and determining coarse and fine locations (positions) of the mobile device 12. The software 64 may be loaded onto the memory 62 by being downloaded via a network connection, uploaded from a disk, etc. The processor 60, the memory 62, and the transceiver 66 are communicatively coupled to one another via the bus 68, with the bus 68 being configured to convey information between the components. The transceiver 66 is configured to send signals to the network 30, and from there to one or more of the base stations 14-16, 20-23 and/or the mobile device 12 as appropriate, to convey information provided by the processor 60. The transceiver 66 is also configured to send signals to the processor 60 to convey information received from the network 30, originating from the mobile device 12 and/or one or more of the base stations 14-16, 20-23.

The location server 32 may be one of a variety of server types. For example, the location server 32 may be an Evolved Serving Mobile Location Centre (E-SMLC), a Secure User Plane Location (SUPL) Location Platform (SLP), a SUPL Location Center (SLC), a SUPL Positioning Center (SPC), a Position Determining Entity (PDE) and/or a gateway mobile location center (GMLC), that may connect to one or more location retrieval functions (LRFs) and/or mobility management entities (MMEs).

The processor 60 is configured to analyze signals received from the mobile device 12 to determine a coarse location of the mobile device 12. The processor 60 analyzes the outbound message received from the mobile device 12 to determine the base stations 14-16, 20-23 in the vicinity of the mobile device 12. By analyzing the locations of these base stations, either known by the location server 32 (i.e., stored in the memory 62 or obtained by the processor 60 (e.g., requested from another device)) or provided in the outbound message, the processor 60 can determine a coarse location (i.e., a location estimate) for the mobile device 12. In particular, the processor 60 analyzes the outbound message from the mobile device 12 for indications of LTE-U base stations because the cell sizes for the LTE-U base stations are typically much smaller than the cell sizes for LTE base stations and thus may provide a better indication of the location of the mobile device 12. With the mobile device 12 reporting one or more of the base stations 14-16 in the outbound message, and knowing the location(s) of the one or more base stations 14-16, the processor 60 can determine a coarse location for the mobile device 12 with better accuracy typically than if no LTE-U base station is reported in the outbound message. The coarse location of the mobile device 12 includes some uncertainty and may be expressed as a point location plus and uncertainty, e.g., a radius.

The processor 60 is further configured to determine LTE base stations neighboring the mobile device 12. The processor 60 can use the coarse location of the mobile device 12, determined based on the outbound message received from the mobile device 12 as described above, to determine the base stations 20-23 that neighbor the mobile device 12. Preferably, the processor 60 determines the base stations 20-23 that neighbor the mobile device 12 and that are well-distributed geographically about the mobile device 12 to provide a geometric dilution of precision (GDOP) that is lower than a GDOP that would be achieved by providing a list of neighbors derived from a coarse location of the mobile device 12 that was based upon an outbound message that did not include an LTE-U base station. The GDOP is a ratio of the change in output location determined based on a change in measured data, or the range of possible locations based on measured data plus uncertainty. For example, the more evenly base stations are distributed around a mobile device, both in terms of angular location and distance from the mobile device, the better the GDOP will typically be. The processor 60 is configured to send the list of neighbor base stations to the mobile device 12 via the bus 68 and the transceiver 66 internally to the location server 32, and via the network 30 and the serving cell of the base stations 20-23.

The processor 60 is further configured to determine a PRS signal search window for each of the base stations 20-23 that the processor 60 sends to the mobile device 12 in the list of neighbor base stations. Based on the coarse location determined by the processor 60, the processor 60 can determine expected RSTD values for the neighbor base stations 20-23. The processor 60 may use the serving cell from among the base stations 20-23 as the reference cell and thus use the PRS signal from the serving cell has the reference signal relative to which the RSTD values apply. The processor 60 determines an expected arrival time of the reference signal at the mobile device 12, and expected arrival times of the PRS signals of the neighbors of the base stations 20-23. The expected arrival time of the reference signal and the expected arrival times of the PRS signals of the neighbors will have some uncertainty due to the uncertainty of the coarse location of the mobile device. The processor 60 therefore determines an uncertainty value for each of the RSTD values. The uncertainties of these RSTD values, however, will typically be lower than uncertainties that would be provided with these RSTD values if the coarse location of the mobile device was determined without knowledge of any nearby LTE-U base station.

The processor 60 is configured to compile and send assistance data to the mobile device 12. For example, the processor 60 sends a list of the neighbor base stations 20-23, including node IDs, along with information to help the mobile device 12 acquire the PRS signals of the neighbor base stations 20-23. The information to help the mobile device acquire the PRS signals may, for example, include the channels (corresponding to frequency bands) that the PRS signals will be on, and the RSTD values of the PRS signals and the uncertainties associated with these RSTD values.

Figure 4:
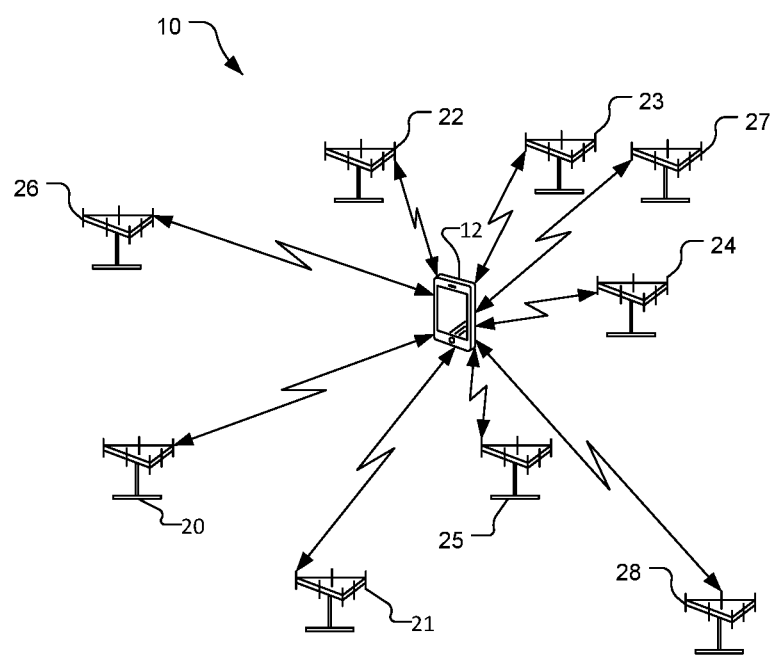
FIG. 4 is a simplified diagram of the wireless communications system shown in FIG. 1 with some components removed and additional base stations shown.

The assistance data provided to the mobile device 12 from the processor 60 may include a ranked list of information for the PRS signals. The ranked list may be discussed herein as ranking base stations or ranking PRS signals corresponding to the base stations. Ranking the base stations in the assistance data may be useful for multiple reasons, e.g., if the location server 32 has a limit on the quantity of base stations that can be included in the assistance data, and/or if the mobile device 12 cannot search for all of the PRS signals indicated by the assistance data. The mobile device 12 may, for example, have limited time to search for PRS signals, e.g., if the location server 32 provides a limited response time for the mobile device 12 to provide signal measurements. The ranking of the base stations 20-28 may be different when LTE-U base station information is provided by the mobile device 12 compared to no LTE-U base station information being provided because the coarse location will likely be more accurate, which may affect the desirability of using one or more of the base stations 20-28. The ranks of the base stations may be based on distances from the base stations to an estimated location of the mobile device (where the estimated location of the mobile device 12 is determined base on, for example, location information of one or more LTE-U base stations, such as base stations 14-16, in communication with mobile device 12), based on a geographic distribution of the base stations, or a combination thereof. For example, the ranks may be based on a distribution of the base stations to provide a desirable expected GDOP, e.g., the lowest expected GDOP based on the available base stations, or the lowest expected GDOP for each quantity of the base stations (i.e., the two highest-ranked base stations will provide the lowest GDOP of any combination of two of the available base stations, the three highest-ranked base stations will provide the lowest GDOP of any combination of three of the available base stations, etc.). Examples of ranked lists are provided below in Tables 1-3 with reference to FIG. 4, that shows the system 10—without explicitly illustrating the base stations 14-16, the network 30, or the location server 32—but with more base stations, in this example LTE base stations 24, 25, 26, 27, 28, than shown in FIG. 1.

TABLE 1

| Node ID | RSTD | RSTD Uncertainty |
|---|---|---|
| 20 | 0 | 0 |
| 23 | 1037 | 36 |
| 21 | 1827 | 48 |
| 26 | 2393 | 63 |
| 24 | 3764 | 78 |
| 22 | 5015 | 114 |
| 25 | 5825 | 132 |

In Table 1, the ranked list shows the base stations 20-26 in the order to be searched for their respective PRS signals, e.g., with the reference base station listed first (where, in the example illustrated in Table 1, base station 20 is the reference base station or node). The RSTD values and the RSTD uncertainty values are provided in terms of a valued to be multiplied by Ts (where Ts=1/(1500 •2048), 3.255•10$^{-7}$ seconds, with the RSTD values being the RSTD relative to the reference base station. In this example, the uncertainties are plus-or-minus the values shown, but one or more of the uncertainties may be asymmetric (i.e., from X to Y where X≠−Y). In this example, the base stations 27 and 28 are not listed even though the base stations 27 and 28 are within communication range of the mobile device 12, e.g., because the location server 32 may have a limit of the number of nodes that can be listed in the assistance data. One or more of the base stations 20-28 may be omitted, for example, if including the base station(s) would increase the GDOP. Further, the base stations 20-28 are listed in an order that helps provide a desirable GDOP if the mobile device 12 cannot search for all the PRS signals.

TABLE 2

| Node ID | Rank | RSTD | RSTD Uncertainty |
|---|---|---|---|
| 20 | 1 | 0 | — |
| 21 | 3 | 1827 | 48 |
| 22 | 6 | 5015 | 114 |
| 23 | 2 | 1037 | 36 |
| 24 | 5 | 3764 | 78 |
| 25 | 7 | 5825 | 132 |
| 26 | 4 | 2393 | 63 |
| 27 | 9 | 6480 | 165 |
| 28 | 8 | 6030 | 150 |

In Table 2, as another example, the ranked list provides a rank number indicating the order in which the base stations 20-28 are to be searched, e.g., with the reference base station having an assigned rank of 1. As discussed above, the ranks of the base stations may be based on the estimated location of the mobile device 12 and are intended to provide an order in which the base stations 20-28 are to be searched for their respective PRS signals.

TABLE 3

| Node ID | RSTD | Search Window |
|---|---|---|
| 20 | 0 | 523-645 |
| 23 | 1037 | 1524-1718 |
| 21 | 1827 | 2311-2520 |
| 26 | 2393 | 2853-3101 |
| 24 | 3764 | 4209-4487 |
| 22 | 5015 | 5424-5774 |
| 25 | 5825 | 6216-6602 |

In Table 3, the ranking of the base stations is indicated by the search windows provided in the assistance data. As shown, a higher-ranked base station, and corresponding PRS signal, has a search window that is closer in time to the reference signal arrival time (i.e., has a lower RSTD) than a lower-ranked base station even if another PRS signal from the lower-ranked base station is expected to arrive at the mobile device 12 before the PRS signal from the higher-ranked base station. Also as shown, the search windows are relative to a reference time that is before the expected arrival time of the signal from the reference base stations, and are provided in terms of Ts, but other formats for the search windows may be used. As discussed above, the ranks of the base stations may be based on the estimated location of the mobile device 12 such that the search windows are relative to both the reference base station and the estimated location of the mobile device 12.

Referring to FIG. 5, with further reference to FIGS. 1-3, the location server 32, the mobile device 12, and base stations, here the base station 20 and the base station 14 exchange several messages. In this example, the base station 20 is an LTE base station, the base station 14 is an LTE-U base station, and the messages exchanged are an example of using the LPP (LTE Positioning Protocol) to perform OTDOA positioning. FIG. 5 is thus an example of message exchanges in an LTE and LTE-U implementation, but the discussion is applicable to other protocols using messages in a dedicated frequency band and outside of the dedicated frequency band.

The mobile device 12 receives a PRS signal 80 from the LTE base station 20 and determines a node ID of the LTE base station 20. The LTE base station 20 periodically sends the PRS signal 80, and the mobile device 12 acquires the PRS signal 80. The mobile device 12 may acquire the PRS signal 80 by listening over large amounts of time and over different channels. Alternatively, the LTE base station 20 is preferably the primary cell that is presently serving the mobile device 12 and thus the mobile device 12 knows the channel and timing of the PRS signal 80 and made us listen on the appropriate channel for a small window of time to acquire the PRS signal 80. The mobile device 12 determines, at a stage 82, the node ID of the LTE base station 20. If the base station 20 is the primary cell, then the mobile device 12 will typically already know the node ID of the base station 20 and thus the stage 82 may be omitted.

The mobile device 12 also receives a CRS signal 84 from the LTE-U base station 14 and determines a node ID of the LTE-U base station 14. The LTE-U base station 14 continuously sends the CRS signal 84, and the mobile device 12 acquires the CRS signal 84 by listening on each of different potential channels for a sufficient amount of time to acquire a CRS on the respective channel. The mobile device 12 determines, at a stage 86, location information for the LTE-U base station 14. The location information is information that the location server 32 may use to determine the location of the LTE-U base station 14. The location information may be, for example, a node ID of the base station 14, an indication (e.g., coordinates) of the actual location of the base station 14, information from which the location may be calculated (e.g., ranging information that may be combined with other crowd-sourced ranging information), etc.

The location server 32 sends a request capabilities message 88 to the mobile device 12. The request capabilities message 88 includes information that indicates the type of capabilities requested. The request capabilities message 88 may, for example, indicate that the location server 32 is requesting to know whether the mobile device 12 supports a particular positioning technique, such as OTDOA or a satellite positioning technique, and/or whether the mobile device supports LTE-U communication.

The mobile device 12 responds to the request capabilities message 88 by sending, to the location server 32, a provide capabilities message 90 that includes information about the capabilities of the mobile device 12. For example, if OTDOA capabilities were requested by the request capabilities message 88, then the provide capabilities message 90 includes information regarding the type of OTDOA mode, if any, that the mobile device 12 supports (e.g., UE-assisted or UE-based OTDOA), the channels (corresponding to frequency bands) for which the mobile device 12 supports Reference Signal Time Difference (RSTD) measurements, and whether the mobile device 12 supports inter-frequency RSTD measurements. Further, the provide capabilities message 90 (aka the provide capability message 90) also provides information about current and/or recent LTE-U base stations from which the mobile device 12 has received a communication. For example, the provide capabilities message 90 may include information for a most recent quantity (e.g., the N most recent) LTE-U base stations from which the mobile device 12 has received a communication, for any LTE-U base station from which the mobile device 12 has received a communication within a threshold amount of recent time (e.g., within the last X minutes), etc. The information provided in the provide capabilities message 90 may include the location information determined at stage 86.

The location server 32 sends a provide assistance data message 92 to the mobile device 12. The provide assistance data message 92 includes assistance data that may be used by the mobile device 12 to acquire and perform measurements on incoming positioning signals. The assistance data may include information about signals that will be sent from the serving base station, neighboring base stations or other signal emitters. For example, for OTDOA, the assistance data may include a cell identifier (e.g., a node ID) that identifies a reference base station, and may include positioning signal timing information for a reference positioning signal transmitted by the reference base station. The positioning signal timing information may include a timing, periodicity, and duration of the positioning signals, here PRS signals, sent by the reference base station. The assistance data further includes a list of one or more other base stations (LTE base stations in this example) from which the mobile device 12 may acquire a positioning signal. For these other base stations, the positioning signal timing information may include an expected RSTD value that the mobile device 12 is expected to measure for each PRS signal relative to the reference signal, and an uncertainty of the expected RSTD value. The list of other base stations may be a ranked list prioritizing the base stations such that the mobile device 12 will attempt to acquire the PRS signals from the other base stations in an order indicated by the ranked list. Examples of ranked lists of base stations are provided above in Tables 1-3, although these examples are not exhaustive and other configurations of ranked lists may be used, including lists with more, less, and/or different information than shown in Tables 1-3.

The location server 32 sends a request location information message 94 to the mobile device 12. The location server 32 may send the request location information message 94 at any time. The request location information message 94 may include an indication of the type of location information that is desired (e.g., RSTD measurements), a desired accuracy of a location estimate, and a response time at which the mobile device 12 should send the location information to the location server 32.

In response to the request location information message 94, the mobile device 12 performs measurements to obtain information to be used to determine the location of the mobile device. In this example, the mobile device 12 performs, at stage 96, RSTD measurements for the base stations indicated by the assistance data. For example, the processor 40 tunes the transceiver 48 to particular channels, corresponding to the indicated base stations, at respective times, indicated by the expected RSTD values, in order to receive PRS signals. Measurement results may include, for each acquired positioning signal other than the reference signal, a time difference between an arrival time of the reference signal and an arrival time of the acquired positioning signal, an identity of the base station from which the signal was received, and an indication of the quality of the measurement. The processor 40 may cause the memory 42 to store the measurement results until a scheduled response time at which the mobile device 12 sends the measurements results to the location server 32.

When the response time received as part of the request location information message 94 arrives (if the response time is a moment in time, or when the response time passes if the response time is a duration), the mobile device 12 sends the measurement results to the location server 32 in a provide location information message 98. The location server 32 can use the measurement results to determine the location of the mobile device 12, e.g., by applying trilateration techniques to the location information provided in the message 98.

The call flow diagram of FIG. 5 is only an example of a positioning technique based on LPP. Any of the messages 88, 90, 92, 94, 98 may be one of multiple messages used to send particular information, e.g., if the information is too large to fit into a single message. Additionally, the assistance data included in the provide assistance data message 92 may include assistance data for more than one positioning technique. Alternatively or additionally, assistance data may be provided by more than one source. For example, in addition to the location server providing assistance data, a third party may send assistance data that are not associated with the network 30 or even associated with any network.

Figure 6:
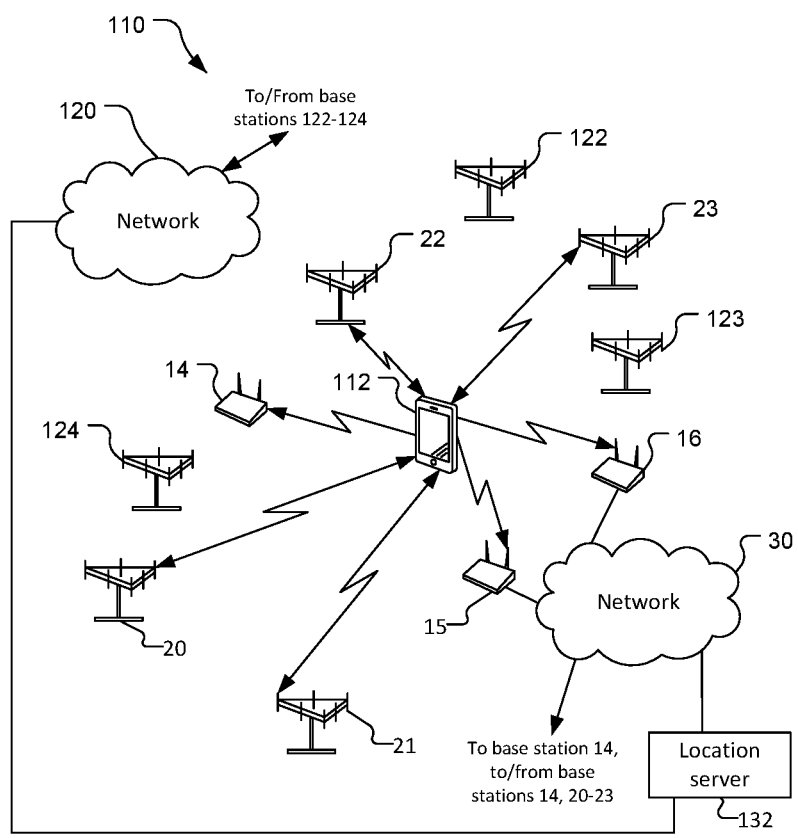
FIG. 6 is a simplified diagram of a wireless communications system that includes multiple communication networks.

Referring to FIG. 6, a wireless communication system 110 includes a mobile device 112, the short-range base stations 14-16, the cellular base stations 20-23, the network 30, a location server 132, a network 120, and cellular base stations 122-124. The short-range base stations 14-16, the cellular base stations 20-23, and the network 30 are shown in FIGS. 1-3 and discussed above. The location server 132 is similar to the location server 32, and is configured to work with the network 30 and the network 120. The network 30 supports LTE and LTE-U operation while the network 120 supports LTE operation but not LTE-U operation. Alternatively, the network 120 could also support LTE-U operation, in which case the system 110 may include one or more LTE-U base stations coupled for bi-directional communication with the network 120. The base stations 122-124 are similar to the base stations 20-23 and are configured to communicate bi-directionally with the mobile device 112 and the network 120, although the communication with the mobile device 112 is not illustrated in FIG. 6 for simplicity of the figure.

Figure 7:
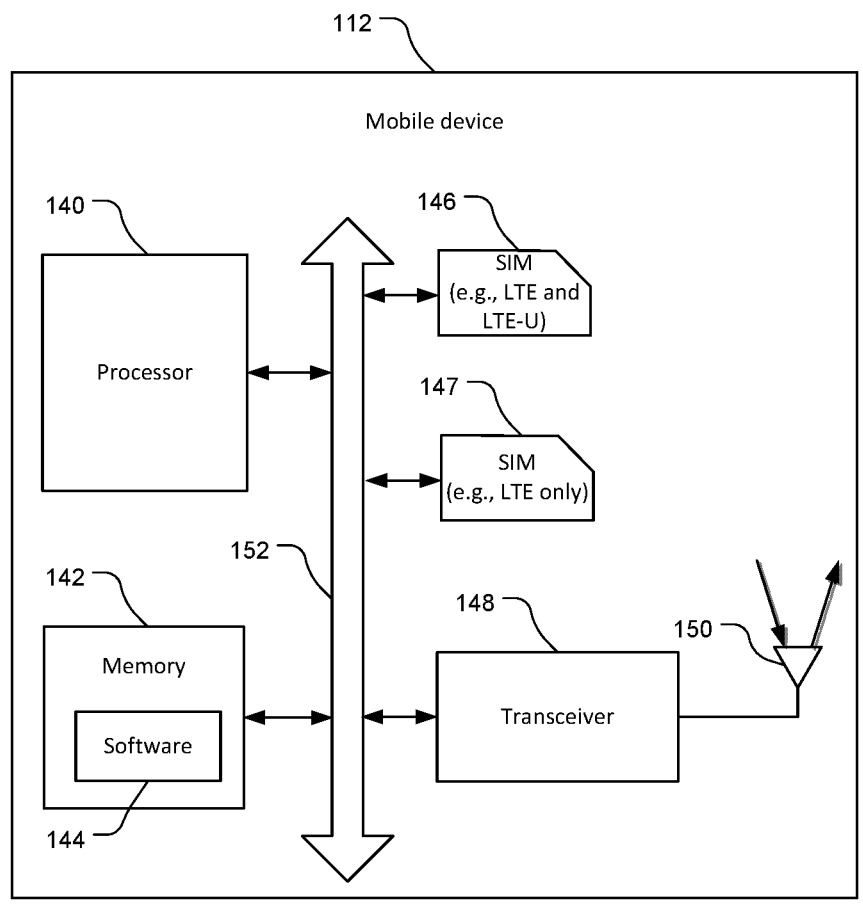
FIG. 7 is a block diagram of an example of a mobile device shown in FIG. 6.

Referring to FIG. 7, with further reference to FIGS. 1-2, an example of the mobile device 112 includes a processor 140, a memory 142 including software 144, a SIM 146, a SIM 147, a transceiver 148, an antenna 150, and a bus 152. The processor 140 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 140 may comprise multiple separate physical entities that can be distributed in the mobile device 112. The memory 142 may include RAM and/or ROM. The processor 140 is communicatively coupled to the memory 142. The memory 142 is a non-transitory, processor-readable storage medium that stores the software 144 which is processor-readable, processor-executable software code containing instructions that are configured to, when performed, cause the processor 140 to perform various functions discussed herein. The description may refer only to the processor 140 performing the functions, but this includes other implementations such as where the processor 140 executes software and/or firmware. The software 144 may not be directly executable by the processor 140 and instead may be configured to, for example when compiled and executed, cause the processor 140 to perform the functions discussed. Whether needing compiling or not, the software 144 contains the instructions to cause the processor 140 to perform the functions. The processor 140 in combination with the memory 142 provide means for performing functions as described herein, for example, receiving and analyzing signals from base stations, and producing and sending communications to a location server with information about the base stations. The software 144 may be loaded onto the memory 142 by being downloaded via a network connection, uploaded from a disk, etc. The processor 140, the memory 142, the SIM 146, the SIM 147, and the transceiver 148 (and by extension the antenna 150) are communicatively coupled to one another via the bus 152, with the bus 152 being configured to convey information between the components.

The SIM 146 is configured to provide access to a first communication network subscription, or simply "a first subscription," associated with the network 30, which may be referred to as a first communication network, and the SIM 147 is configured to provide access to a second communication network subscription, or simply "a second subscription," associated with the network 120, which may be referred to as a second communication network. Thus, the SIM 146 may be considered to be a first subscription-access device and the SIM 147 may be considered to be a second subscription-access device. Each of the SIMs 146, 147 may be, for example, part of a Universal Integrated Circuit Card (UICC) and may include a processor, ROM, RAM, EEPROM and/or circuitry. Each of the SIMs 146, 147 is configured to store user account information, an international mobile subscriber identity (IMSI), SIM application toolkit (SAT) command instructions, and storage space for additional information, such as telephone book contact information. In this example, the SIM 146 is configured to support LTE operation and LTE-U operation while the SIM 147 is configured to support LTE operation but not LTE-U operation. LTE and LTE-U are examples, and other examples of a protocol with a dedicated frequency band (e.g., a licensed band) and frequencies outside the dedicated frequency band (e.g., an unlicensed band) may be used.

The processor 140 is configured to select which of the SIMs 146, 147 to use. For example, the processor 140 is configured to respond to initiation of a position-determination session (for determining a position of the mobile device 112) by selecting the SIM 146 because the SIM 146 supports LTE-U operation and thus may communicate with one or more LTE-U base stations. For example, placing of an e-911 call may initiate (among other things) a position determination session so that the processor 140 may select which of the SIMs 146, 147 to use in response to an e-911 call being initiated. If the SIM 146 has received one or more communications recently from one or more of the LTE-U base station 14-16, then the location server 32 will likely be able to determine a more accurate coarse location for the mobile device 112 than if the SIM 147 is used. The processor 140 may be configured to select which SIM 146, 147 to use for a position-determination session based on node deployments of the base stations 14-16, 20-23, 122-124 associated with the networks 30, 120. For example, the processor 140 may be configured to select, for use in position-determination, the SIM of the SIMs 146, 147 that is associated with a better deployment of base stations. The processor 140 may be configured to determine that a first deployment of nodes is better than a second deployment of nodes if the first deployment has more nodes within a threshold range of the mobile device 112, or if the first deployment will likely yield a better GDOP for the determined location of the mobile device 112, or a combination thereof. The processor 140 may be configured to determine that a lower GDOP is likely if a set of base stations are more symmetrically deployed around the mobile device 112 including azimuth distribution of the base stations around the mobile device and distances from the mobile device to the base stations. The processor 140 may be configured to select between SIMs to use for a position-determination session based on node deployment associated with networks where neither of the networks support LTE-U operation and/or where neither of the SIMs support LTE-U operation, or where both of the networks support LTE-U operation and both of the SIMs support LTE-U operation. Where both networks and both SIMs support LTE-U operation, the processor 140 may select one of the SIMs using one or more of various criteria. Such criteria may include, for example, a default SIM selection, the SIM corresponding to the network with more complete coverage near the mobile device 112, or the SIM corresponding to the network with better node deployment, and the processor 140 may weight LTE-U nodes more than LTE nodes in determining better deployment, e.g., where the better deployment is based on quantity and/or distribution of nodes. Analyzing the LTE-U support and/or the node distribution may be used as a factor in selecting one of the SIMs 146, 147 for an E-911 call in a multi-SIM mobile device.

Figure 8:
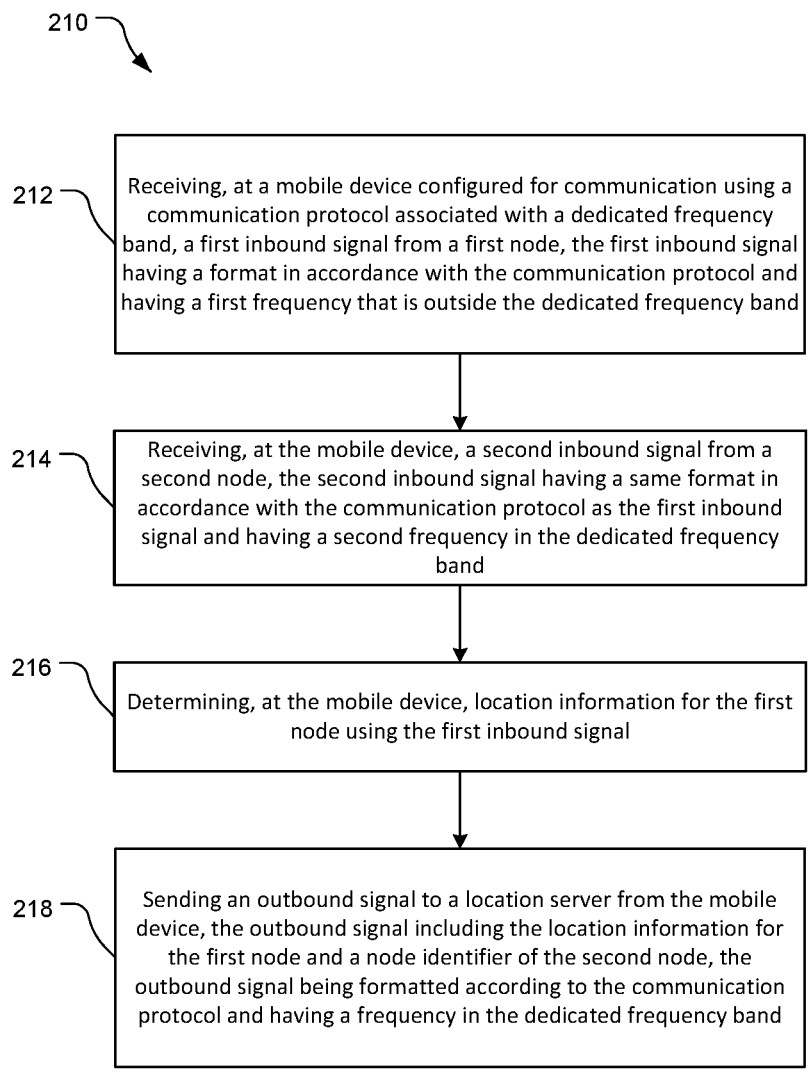
FIG. 8 is a block flow diagram of an example method of operating the wireless communication system of FIG. 1 or the wireless communication device of FIG. 6.

Referring to FIG. 8, with further reference to FIGS. 1-7, a method 210 includes the stages shown. The method 210 is, however, an example only and not limiting. The method 210 may be altered, e.g., by having stages added, removed, rearranged, combined, performed concurrently, and/or having single stages split into multiple stages.

At stage 212, the method 210 includes receiving, at a mobile device configured for communication using a communication protocol associated with a dedicated frequency band, a first inbound signal from a first node, the first inbound signal having a first format in accordance with the communication protocol and having a first frequency that is outside the dedicated frequency band. For example, the mobile device 12 receives a respective signal from each of one or more of the base stations 14-16 using the SIM 46. As another example, the mobile device 112 receives a respective signal from each of one or more of the base stations 14-16 using the SIM 146. Means for performing the process(es) associated with stage 212 may, for example, include the antenna 50, the SIM 46, the transceiver 48, the bus 50, the processor 40, and/or the memory 42. Means for performing the process(es) associated with stage 212 may, for another example, include the antenna 150, the SIM 146, the transceiver 148, the bus 150, the processor 140, and/or the memory 142.

At stage 214, the method 210 includes receiving, at the mobile device, a second inbound signal from a second node, the second inbound signal having a same format in accordance with the communication protocol as the first inbound signal and having a second frequency in the dedicated frequency band. For example, the mobile device 12 receives a respective signal from each of one or more of the base stations 20-23 using the SIM 46. As another example, the mobile device 112 receives a respective signal from each of one or more of the base stations 20-23 using the SIM 146 and/or receives a respective signal from each of one or more of the base stations 122-124 using the SIM 147. Means for performing the process(es) associated with stage 214 may, for example, include the antenna 50, the SIM 46, the transceiver 48, the bus 50, the processor 40, and/or the memory 42. Means for performing the process(es) associated with stage 214 may, for another example, include the antenna 150, the SIM 146, the SIM 147, the transceiver 148, the processor 140, and/or the memory 142.

At stage 216, the method 210 includes determining, at the mobile device, location information for the first node using the first inbound signal. The location information may comprise one, or both, of a node ID that identifies the first node and an actual location of the first node. For example, the processor 40 determines a node ID that identifies the base station that sent the respective received signal, which may be a CRS signal. The mobile device may be a user equipment (e.g., that communicates using the LTE protocol), the communication protocol may be the LTE protocol, the dedicated frequency band is a licensed LTE frequency band, the first frequency is in an LTE-Unlicensed (LTE-U) frequency band, and the second node is an LTE node (e.g., an LTE cellular base station). The first node may be a short-range base station such as an LTE-U base station. Means for performing the process(es) associated with stage 216 may, for example, include the processor 40 and the memory 142 including the software 144. Means for performing the process(es) associated with stage 216 may, for another example, include the processor 140 and the memory 142 including the software 144.

At stage 218, the method includes sending an outbound signal to a location server from the mobile device, the outbound signal including the location information for the first node and a node identifier of the second node, the outbound signal being formatted according to the communication protocol and having a frequency in the dedicated frequency band. For example, the outbound signal may be a provide-capability message in the LTE protocol, may indicate a respective node ID of each of one or more of the LTE-U base stations 14-16 as the location information, and may include a respective node ID of one or more of the base stations 20-23 (which may include LTE base stations) or one or more of the base stations 122-124 (which may include LTE base stations). The processor 40 may produce and send the outbound signal via the bus 52, the transceiver 48, and the antenna 50 to the location server 32 via the primary cell of the base stations 20-23. Means for performing the process (es) associated with stage 212 may, for example, include the processor 40, the memory 42 including the software 44, the bus 52, the transceiver 48, and the antenna 50. Means for performing the process(es) associated with stage 212 may, for another example, include the processor 140, the memory 142 including the software 144, the bus 152, the transceiver 148, and the antenna 150.

Various additions and alterations to the method 210 are possible. For example, in the LTE context, the method 210 may further include selecting, by the mobile device 12 (user equipment) and from between an LTE-U-enabled subscription-access device of the user equipment and a non-LTE-U-enabled subscription-access device of the user equipment, the LTE-U-enabled subscription-access device for use in a position-determination session. For example, the processor 140 may select the SIM 146 over the SIM 147 for use in position determination such that LTE-U base station information may be obtained and provided to the location server 132. The location server 132 uses the LTE-U base station information to determine a coarse location of the mobile device 112, which the location server 132 uses to determine assistance data (e.g., cellular base station node IDs and corresponding search windows) that the location server 132 provides to the mobile device 112. The search windows determined by the location server 132 will typically be smaller than if the coarse location (or estimated location) was not based on any LTE-U base station information. The mobile device 112 uses the assistance data to more efficiently acquire and measure PRS signals (e.g., using less time than would have been used with assistance data not based on LTE-U base station information). The mobile device may use less than the entire search window to acquire and measure a particular PRS signal as the processor 140 (or the processor 40) is preferably configured to terminate listening for the PRS signal before the expiration of the respective search window if the PRS signal has been acquired.

As another example of a modification to the method 210 in the LTE context, the method 210 may further include: determining that a first subscription network, corresponding to a first LTE-U-enabled subscription-access device of the user equipment, has a better node deployment proximate to the user equipment than a second subscription network, corresponding to a second LTE-U-enabled subscription-access device of the user equipment; and selecting, by the user equipment, the first LTE-U-enabled subscription-access device for use in a position-determination session in response to the determining that the first subscription network has a better node deployment proximate to the user equipment than the second subscription network. For example, the processor 140 selects a SIM corresponding to a network that has more nodes, more evenly-distributed nodes in a vicinity of the mobile device 112, a lower expected GDOP, etc. In determining which network has more evenly-distributed nodes near the mobile device 112, the processor 140 may consider the distribution of LTE-U nodes only, may consider the distribution of LTE-U nodes only (but only if both networks have at least a threshold quantity of LTE-U nodes within a threshold distance of the mobile device), or may favor the evenness (or symmetry) of the distribution of LTE-U nodes over the distribution of LTE nodes (e.g., determining a value of evenness for LTE-U nodes and a value of evenness for LTE nodes for each network, but weighting the value of evenness of LTE-U nodes for each network).

As another example of a modification to the method 210 in the LTE context, the method 210 may further include: receiving, at the mobile device (user equipment), assistance data from the location server, the assistance data including a ranked list of information for a plurality of positioning reference signals; and searching for the plurality of positioning reference signals in an order according to the ranked list. For example, the processor 40 may provide a ranked list (examples of which are provided in Tables 1-3) and the mobile device 12 may attempt to acquire and measure PRS signals from respective nodes in the order indicated by the ranked list. The ranked list may have the positioning signals ranked based on distances from respective nodes to the mobile device (e.g., to an estimated location of the mobile device) or based on a geographic distribution of the nodes relative to the mobile device. For example, the received ranked list of information for the positioning reference signals is based on the outbound signal sent to the location server.

As another example of a modification to the method 210 in the LTE context, the method 210 may further include: receiving, at the mobile device, assistance data from the location server, the assistance data including a respective search window for each of a plurality of positioning reference signals corresponding to each of a plurality of nodes; waiting for the respective search window for each of the plurality of positioning reference signals; and searching for each of the plurality of positioning reference signals during the respective search window. For example, the location server 32 may use the location information provided by the mobile device 12 to determine a coarse location of the mobile device 12 that the location server uses to determine assistance data that the location server 32 provides to the mobile device 12. The location server 32 determines neighbor nodes and expected arrival times of positioning signals for the neighbor nodes. The location server 32 determines expected RSTD values and uncertainty values for the expected RSTD values and supplies these values to the mobile device 12. In some implementations, the location server 32 ranks the nodes/positioning signals in the assistance data as discussed above. The mobile device 12 waits for the respective search windows to attempt to acquire the positioning signals in order to conserve power. The mobile device 12 searches for the respective positioning signals in the respective search windows, preferably terminating the search before expiration of the search window if the positioning signal is acquired in order to conserve power.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof means A or B or C or AB or AC or BC or ABC (i.e., A and B and C), or combinations with more than one feature (e.g., AA, AAB, ABBC, etc.).

A signal, or signals, may be referred to by the same term despite having been processed or otherwise altered. For example, a wireless signal may be received and transduced, and perhaps decoded or had information added or removed or have otherwise been modified, yet the wireless signal and the modified signal may both be referred to by the same term such as "the received signal." Thus, the same signal term may be used as a shorthand reference to shared content of the unmodified and the modified signal.

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process or a method that is depicted as a flow diagram or block diagram. Although operations may be discussed as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, more than one invention may be disclosed.

What is claimed is:

1. A method comprising:
   receiving, at a mobile device configured for communication using a communication protocol associated with a dedicated frequency band, a first inbound signal from a first node communicating outside the dedicated frequency band, the first inbound signal having a format in accordance with the communication protocol and having a first frequency that is outside the dedicated frequency band;
   receiving, at the mobile device, a second inbound signal from a second node, the second inbound signal having a same format in accordance with the communication protocol as the first inbound signal and having a second frequency in the dedicated frequency band;
   determining, at the mobile device, location information for the first node communicating outside the dedicated frequency band using the first inbound signal;

sending an outbound signal to a location server from the mobile device, the outbound signal including the location information for the first node communicating outside the dedicated frequency band and a node identifier of the second node, the outbound signal being formatted according to the communication protocol and having a frequency in the dedicated frequency band; and receiving, at the mobile device from the location server, assistance data determined by the location server using the location information for the first node communicating outside the dedicated frequency band.

2. The method of claim 1, wherein the mobile device is a user equipment, the communication protocol is a Long-Term Evolution (LTE) protocol, the dedicated frequency band is a licensed LTE frequency band, the first frequency is in an LTE-Unlicensed (LTE-U) frequency band, the first node is an LTE-U base station, and the second node is an LTE node.

3. The method of claim 2, further comprising selecting, by the user equipment, an LTE-U-enabled subscription-access device for use in a position-determination session, wherein the user equipment is capable of the selecting from between the LTE-U-enabled subscription-access device of the user equipment and a non-LTE-U-enabled subscription-access device of the user equipment.

4. The method of claim 2, further comprising:
determining that a first subscription network, corresponding to a first LTE-U-enabled subscription-access device of the user equipment, has a better node deployment proximate to the user equipment than a second subscription network, corresponding to a second LTE-U-enabled subscription-access device of the user equipment; and
selecting, by the user equipment, the first LTE-U-enabled subscription-access device for use in a position-determination session in response to the determining that the first subscription network has the better node deployment proximate to the user equipment than the second subscription network.

5. The method of claim 2, wherein the outbound signal is a provide-capability message in the LTE protocol.

6. The method of claim 1, further comprising:
searching for a plurality of positioning reference signals in an order according to a ranked list of information for the plurality of positioning reference signals received from the location server in the assistance data.

7. The method of claim 6, wherein the ranked list of information has the plurality of positioning signals ranked based on distances from respective nodes to the mobile device or based on a geographic distribution of the plurality of nodes relative to the mobile device, wherein the received ranked list of information for the plurality of positioning reference signals is based on the outbound signal sent to the location server.

8. The method of claim 1, wherein the location information comprises one, or both, of a node ID that identifies the first node and an actual location of the first node.

9. A mobile wireless communication device comprising:
an antenna configured to send and receive first signals in a first frequency band and to receive second signals in a second frequency band, the second frequency band being dedicated to a communication protocol and the first frequency band being separate from the second frequency band; and
a processor, communicatively coupled to the antenna, configured to:
receive, from the antenna, a first inbound signal from a first node communicating outside the dedicated frequency band, the first inbound signal having a first frequency in the first frequency band and having a format in accordance with the communication protocol;
receive, from the antenna, a second inbound signal from a second node, the second inbound signal having a second frequency in the second frequency band and having a same format in accordance with the communication protocol as the first inbound signal;
determine location information for the first node communicating outside the dedicated frequency band using the first inbound signal;
send, via the antenna, an outbound signal to a location server, the outbound signal including the location information for the first node communicating outside the dedicated frequency band and a node ID that identifies the second node, the outbound signal being formatted according to the communication protocol and having a frequency in the second frequency band; and
receive, via the antenna from the location server, assistance data determined by the location server using the location information for the first node communicating outside the dedicated frequency band.

10. The mobile wireless communication device of claim 9, wherein the mobile wireless communication device is a user equipment, the communication protocol is a Long-Term Evolution (LTE) protocol, the second frequency band is a licensed LTE frequency band, and the first frequency band is an LTE-Unlicensed (LTE-U) frequency band, and wherein the processor is further configured to:
search for a plurality of LTE node positioning reference signals in an order according to a ranked list of information for the plurality of LTE node positioning reference signals received from the location server in the assistance data.

11. The mobile wireless communication device of claim 9, further comprising:
a first subscription-access device communicatively coupled to the processor and to the antenna and configured to provide access by the mobile wireless communication device to a first communication network; and
a second subscription-access device communicatively coupled to the processor and to the antenna and configured to provide access by the mobile wireless communication device to a second communication network;
wherein between the first subscription-access device and the second subscription-access device, only the first subscription-access device can provide access to Long-Term Evolution Unlicensed (LTE-U) nodes; and
wherein the processor is further configured to select, in response to initiation of a position-determination session, the first subscription-access device for use in the position-determination session.

12. The mobile wireless communication device of claim 9, further comprising:
a first Long-Term Evolution Unlicensed enabled (LTE-U-enabled) subscription-access device communicatively coupled to the processor and to the antenna and configured to provide access by the mobile wireless communication device to a first communication network; and
a second LTE-U-enabled subscription-access device communicatively coupled to the processor and to the antenna and configured to provide access by the mobile wireless communication device to a second communication network;

wherein the processor is further configured to:
  determine that the first communication network has a better node deployment proximate to the mobile wireless communication device than the second communication network; and
  select the first LTE-U-enabled subscription-access device for use in a position-determination session in response to determining that the first communication network has the better node deployment proximate to the mobile wireless communication device than the second communication network.

13. The mobile wireless communication device of claim 9, wherein the communication protocol is a Long-Term Evolution (LTE) protocol, the second frequency band is a licensed LTE frequency band, and the first frequency band is an LTE-Unlicensed (LTE-U) frequency band, and wherein the processor is configured to produce the outbound signal such that the location information for all LTE-U nodes indicated by the outbound signal is prioritized ahead of any LTE node that is indicated by the outbound signal.

14. The mobile wireless communication device of claim 13, wherein the processor is configured to produce the outbound signal, such that the location information for all the LTE-U nodes indicated by the outbound signal is prioritized ahead of any LTE node that is indicated by the outbound signal, in response to the processor determining that a quantity of the LTE-U nodes for which the processor has information available to include in the outbound signal plus a quantity of LTE nodes for which the processor has information available to include in the outbound signal exceeds a limit of nodes that can be reported in the outbound signal.

15. A mobile wireless communication device comprising:
  means for receiving a first inbound signal from a first node communicating outside the dedicated frequency band, the first inbound signal having a format in accordance with a communication protocol associated with a dedicated frequency band and having a first frequency that is outside the dedicated frequency band;
  means for receiving a second inbound signal from a second node, the second inbound signal having a same format in accordance with the communication protocol as the first inbound signal and having a second frequency in the dedicated frequency band;
  first determining means for determining location information for the first node communicating outside the dedicated frequency band using the first inbound signal;
  means for sending an outbound signal to a location server, the outbound signal including the location information for the first node communicating outside the dedicated frequency band and a node identifier of the second node, the outbound signal being formatted according to the communication protocol and having a frequency in the dedicated frequency band; and
  means for receiving, at the mobile device from the location server, assistance data determined by the location server using the location information for the first node communicating outside the dedicated frequency band.

16. The mobile wireless communication device of claim 15, wherein the mobile wireless communication device is a user equipment, the communication protocol is a Long-Term Evolution (LTE) protocol, the dedicated frequency band is a licensed LTE frequency band, the first frequency is in an LTE-Unlicensed (LTE-U) frequency band, the first node is an LTE-U base station, and the second node is an LTE node.

17. The mobile wireless communication device of claim 16, further comprising means for selecting an LTE-U-enabled subscription-access device for use in a position-determination session from among the LTE-U-enabled subscription-access device of the user equipment and a non-LTE-U-enabled subscription-access device of the user equipment.

18. The mobile wireless communication device of claim 16, further comprising:
  second determining means for determining that a first subscription network, corresponding to a first LTE-U-enabled subscription-access device of the user equipment, has a better node deployment proximate to the user equipment than a second subscription network, corresponding to a second LTE-U-enabled subscription-access device of the user equipment; and
  means for selecting the first LTE-U-enabled subscription-access device for use in a position-determination session in response to the second determining means determining that the first subscription network has the better node deployment proximate to the user equipment than the second subscription network.

19. The mobile wireless communication device of claim 15, further comprising:
  means for searching for a plurality of positioning reference signals in an order according to a ranked list of information for the plurality of positioning reference signals received from the location server in the assistance data.

20. The mobile wireless communication device of claim 19, wherein the ranked list of information has the plurality of positioning signals ranked based on distances from respective nodes to the mobile wireless communication device or based on a geographic distribution of the plurality of nodes relative to the mobile wireless communication device, and wherein the ranked list of information is based on the outbound signal.

21. A non-transitory, processor-readable storage medium including processor-readable instructions configured to cause a processor to:
  receive a first inbound signal from a first node communicating outside the dedicated frequency band, the first inbound signal having a format in accordance with a communication protocol associated with a second frequency band that is dedicated to the communication protocol, the first inbound signal having a first frequency that is in a first frequency band that is separate from the second frequency band;
  receive a second inbound signal from a second node, the second inbound signal having a same format in accordance with a communication protocol as the first inbound signal and having a second frequency in the second frequency band;
  determine location information for the first node communicating outside the dedicated frequency band using the first inbound signal;
  send an outbound signal to a location server, the outbound signal including the location information for the first node communicating outside the dedicated frequency band and a node ID that identifies the second node, the outbound signal being formatted according to the communication protocol and having a frequency in the second frequency band; and
  receive, via the antenna from the location server, assistance data determined by the location server using the location information for the first node communicating outside the dedicated frequency band.

22. The storage medium of claim 21, wherein the communication protocol is a Long-Term Evolution (LTE) protocol, the second frequency band is a licensed LTE frequency band, and the first frequency band is an LTE-Unlicensed (LTE-U) frequency band, and wherein the instructions further comprise instructions configured to cause the processor to:
  search for a plurality of LTE node positioning reference signals in an order according to a ranked list of information for the plurality of LTE node positioning reference signals received from the location server in the assistance data.

23. The storage medium of claim 21, further comprising instructions configured to cause the processor to select, in response to initiation of a position-determination session, an LTE-U-enabled (Long-Term Evolution Unlicensed enabled) subscription-access device for use in the position-determination session from among the LTE-U-enabled subscription-access device and a non-LTE-U-enabled subscription-access device.

24. The storage medium of claim 21, further comprising instructions configured to cause the processor to:
  determine that a first communication network has a better node deployment proximate to a user equipment than a second communication network; and
  select a first LTE-U-enabled (Long-Term Evolution Unlicensed enabled) subscription-access device, instead of a second LTE-U-enabled subscription-access device, for use in a position-determination session in response to determining that the first communication network has the better node deployment proximate to the user equipment than the second communication network;
  wherein the first LTE-U-enabled subscription-access device is configured to provide access to the first communication network; and
  wherein the second LTE-U-enabled subscription-access device is configured to provide access to the second communication network.

25. The storage medium of claim 21, wherein communication protocol is a Long-Term Evolution (LTE) protocol, the second frequency band is a licensed LTE frequency band, and the first frequency band is an LTE-Unlicensed (LTE-U) frequency band, the instructions further comprising instructions configured to cause the processor to produce the outbound signal such that the location information for all LTE-U nodes indicated by the outbound signal is prioritized ahead of any LTE node that is indicated by the outbound signal.

26. The storage medium of claim 25, wherein the instructions configured to cause the processor to produce the outbound signal are configured to cause the processor to produce the outbound signal such that the location information for all LTE-U nodes indicated by the outbound signal is prioritized ahead of any LTE node that is indicated by the outbound signal in response to the processor determining that a quantity of the LTE-U nodes for which the processor has information available to include in the outbound signal plus a quantity of LTE nodes for which the processor has information available to include in the outbound signal exceeds a limit of nodes that can be reported in the outbound signal.

* * * * *